(12) United States Patent
Schopfer et al.

(10) Patent No.: US 7,541,790 B2
(45) Date of Patent: Jun. 2, 2009

(54) METHOD AND APPARATUS FOR POWER SAVINGS IN A SWITCHING REGULATOR

(75) Inventors: Walter S. Schopfer, Austin, TX (US); Richard B. Webb, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 265 days.

(21) Appl. No.: 11/450,790

(22) Filed: Jun. 9, 2006

(65) Prior Publication Data

US 2007/0285069 A1 Dec. 13, 2007

(51) Int. Cl.
*G05F 1/40* (2006.01)
(52) U.S. Cl. .................................................. 323/282
(58) Field of Classification Search ................ 323/281, 323/282, 283, 284, 285, 351
See application file for complete search history.

(56) References Cited

U.S. PATENT DOCUMENTS

| | | | | |
|---|---|---|---|---|
| 5,568,044 A | * | 10/1996 | Bittner | 323/272 |
| 5,638,440 A | | 6/1997 | Nix et al. | 379/412 |
| 6,469,921 B2 | * | 10/2002 | Arai et al. | 363/98 |
| 6,778,663 B1 | | 8/2004 | Schopfer | 379/377 |
| 7,042,202 B2 | * | 5/2006 | Sutardja et al. | 323/283 |
| 2006/0022657 A1 | * | 2/2006 | Sutardja et al. | 323/283 |
| 2006/0255782 A1 | * | 11/2006 | Sugiyama et al. | 323/282 |

* cited by examiner

*Primary Examiner*—Adolf Berhane
(74) *Attorney, Agent, or Firm*—Trop, Pruner & Hu, P.C.

(57) ABSTRACT

In one embodiment, the present invention includes a regulator having a pulse width modulation (PWM) controller to generate a PWM control signal based on a voltage level of a load coupled to the regulator, a driver to provide a drive signal to a switching element of the regulator responsive to the PWM control signal, and a power saver coupled between the PWM controller and the driver to receive the PWM control signal and to output the PWM control signal to the driver at a reduced rate during an idle mode of the load.

8 Claims, 5 Drawing Sheets

METHOD AND APPARATUS FOR POWER SAVINGS IN A SWITCHING REGULATOR

FIELD OF THE INVENTION

The present invention relates to power supplies, and more particularly to a switched mode power supply.

BACKGROUND

Electronic circuitry is often powered by electricity received from line currents. To condition the incoming line current to one or more desired voltages at which circuitry operates, oftentimes a voltage regulator is present. Although many different types of voltage regulation circuits exist, a common regulator found in electronic equipment is a switched mode power supply (SMPS). Such a power supply receives an incoming voltage, i.e., an unregulated voltage at a first voltage level and converts the voltage to one or more desired voltage levels, which may be higher or lower than the input voltage level. The SMPS further regulates the output voltage level to reduce the effects of spikes or surges on the line.

Switched mode power supplies typically include a switching transistor that is switched on and off by a drive signal, e.g., it is controlled in a pulse width modulated (PWM) manner. When the switching transistor is on, a voltage is provided to charge an inductive mechanism in the power supply such as one or more inductors or coils of a transformer. When the drive signal is switched off, the inductive mechanism discharges to provide the desired voltage. Due to various circuitry with the power supply, power losses result from the switching.

While such switched mode power supplies are suitable for many applications, their application becomes difficult when a load that is coupled to the power supply requires widely differing power levels in different modes of operation. To provide the desired multiple power levels, various mechanisms are used, including the presence of multiple inductors that are switched into or out of the power supply based upon the required load. However, the presence of multiple inductors increases the size of the power supply. Furthermore, switching of the multiple inductors increases complexity. Furthermore, the power supply can suffer from greater power losses as a result of additional switching cycles. A need thus exists for improved control of a power supply.

SUMMARY OF THE INVENTION

In one aspect, the present invention is directed to a voltage regulator that includes a pulse width modulation (PWM) controller to generate a PWM control signal based on a voltage level of a load coupled to the voltage regulator, a driver to provide a drive signal to a switching element of the voltage regulator responsive to the PWM control signal, and a power saver coupled between the PWM controller and the driver to receive the PWM control signal and to output the PWM control signal to the driver at a reduced rate during an idle mode of the load. The power saver may include a logic circuit having a counter to receive a clock signal and generate a counter output, and circuitry to receive the counter output, an enable signal from the load, and the PWM control signal and to output the PWM control signal to the driver at the reduced rate.

In some implementations, the voltage regulator may be a switched power supply that includes a single inductor that can generate inductive currents to drive loads having variable power requirements. The single inductor may be sized to optimize power consumption in a medium load mode of a variable load. As one example, a load may be a subscriber line interface circuit (SLIC).

Yet another aspect of the present invention is directed to a method for generating a PWM signal to drive a switching element of a switching regulator, and preventing the PWM signal from driving the switching element based on a power consumption level of a load coupled to the switching regulator. The PWM signal may be prevented when the power consumption level is below a predetermined threshold. As one example, the switching element may be driven with the PWM signal every $N^{th}$ pulse of the PWM signal when the power consumption level is below a given threshold.

Still other embodiments are directed to a system including a voltage regulator having circuitry, programmed logic, software, firmware or the like to reduce coupling of a drive signal to a switching element based on a power consumption level of a load coupled to the regulator. The system may take various forms including, for example, a voice over internet protocol modem, a line card or the like. In such systems, a SLIC may be powered by the regulator.

DETAILED DESCRIPTION

In various embodiments, mechanisms are provided to enable reducing idle power of a switching regulator when light loads are coupled thereto. For example, many loads can have different power requirements depending on their operation. As one example, a subscriber line interface circuit (SLIC) coupled to a switching regulator may operate at different power levels depending on whether a subscriber equipment coupled to the SLIC, e.g., a telephone, is on hook, in talk mode, or in ringing mode.

By reducing an on time of a switching element of the regulator, e.g., a switching transistor that enables coupling of a supply voltage to an inductive mechanism, reduced power consumption can occur. In some embodiments, the switching element may be enabled at a lower rate than during normal operation. That is, a pulse width modulation (PWM) control signal that enables the switching element can be prevented from coupling to the switching element according to a desired rate. For example, pulses of the PWM control signal may be coupled to the switching element once every N pulses to reduce the active on time of the switching element. In various implementations, N may be a number greater than one, and in particular implementations may correspond to an integer number, for example, between three and five, although the scope of the present invention is not limited in this regard.

While various mechanisms to enable power saving in a switching regulator can be realized, in some implementations logic circuitry may be used to reduce the PWM control signal's ability to generate a drive signal for a switching element according to a desired rate. For example, instead of coupling every PWM control pulse to a switch driver that in turn generates the drive signal for the switching element, one out of every N PWM control pulses is coupled to the switch driver.

Figure 1:
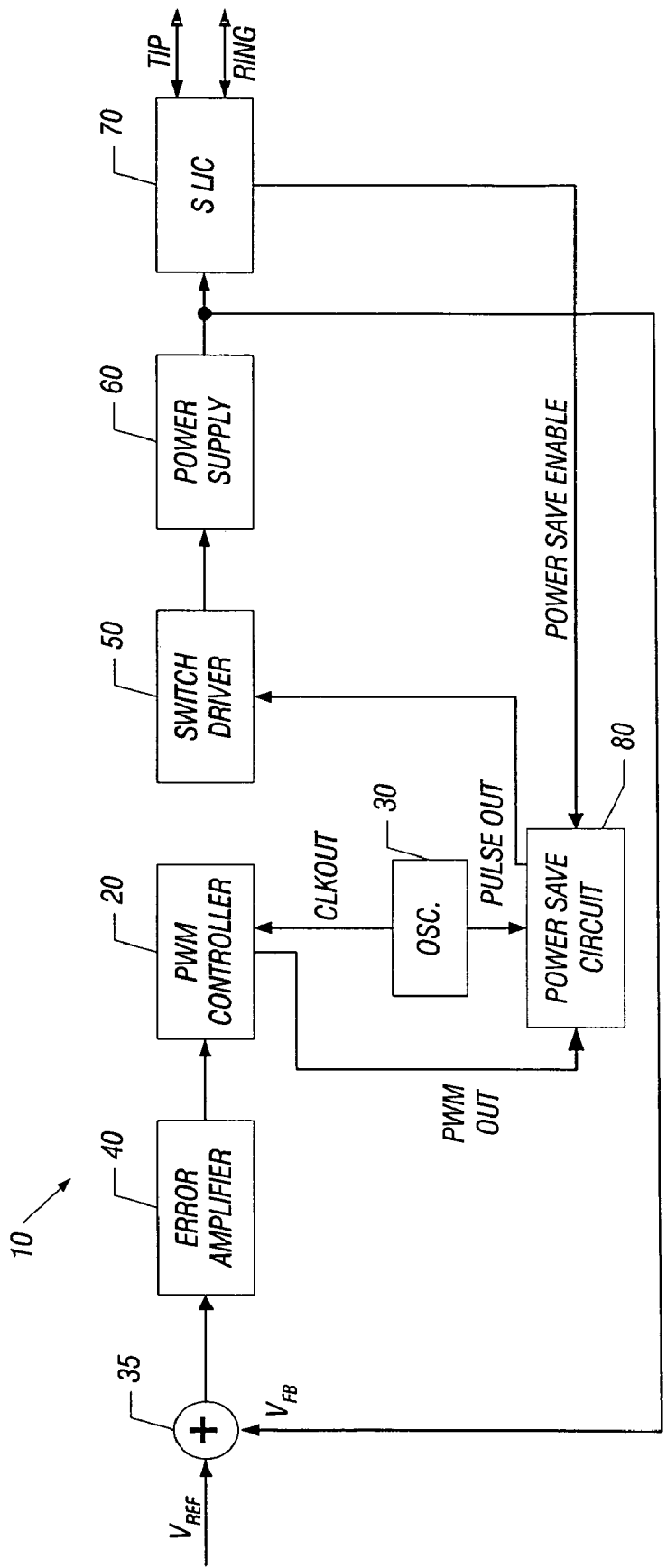
FIG. 1 is a block diagram of a system in accordance with one embodiment of the present invention.

Referring now to FIG. 1, shown is a block diagram of a system in accordance with one embodiment of the present invention. As shown in FIG. 1, system 10 may be used to provide a regulated voltage to a load such as a line card or other device including a SLIC. Such a SLIC may operate in multiple modes of operation. For example, different power levels are required by a SLIC depending on its mode of operation. That is, when a phone or other subscriber equipment to which the SLIC is coupled is on hook, very low power is required. During a talk mode, a modest level of power consumption is required. When the SLIC performs ringing for the subscriber equipment, a high power requirement is needed. For example, power requirements can range from approximately 0.8 watts for talk mode (with on-hook conditions having an even lower power requirement, e.g., less than 100 milliwatts), while ringing mode can require significantly greater power, e.g., on the order of 10 times the power, for example, 7 watts. Of course, in other embodiments many other different types of loads may be powered by a voltage regulator in accordance with an embodiment of the present invention. Because of the switching occurring in a power supply, power efficiency can be roughly similar at various power levels (above a minimal power consumption level). Embodiments may be used to reduce the frequency of switching in low load modes of operation.

As shown in FIG. 1, a power supply 60 which may be a switched mode power supply is coupled to provide a regulated voltage to a SLIC 70, which is shown coupled to tip and ring lines. While in the embodiment of FIG. 1 the load may be a line card including a SLIC, in other implementations any other device requiring a regulated voltage may be the load. In many implementations, SLIC 70 may require different power levels depending on mode of operation. For example, different power levels are required based on different modes of operation. Accordingly, power supply 60 may provide different power outputs based on power needed by SLIC 70.

To enable delivery of a regulated voltage at a given level, a switch driver 50 may be coupled to power supply 60. Switch driver 50 may provide a switch signal to alternately enable and disable a drive signal for a switching transistor within power supply 60. To generate this switch signal, switch driver 50 may be coupled to receive a control signal from a PWM controller 20. As shown in FIG. 1, PWM controller 20 may provide an output (i.e., PWMOUT) that is coupled to a power save circuit 80 that in turn generates an output signal to control switch driver 50.

PWM controller 20 may be configured to generate a logic control signal for output to power save circuit 80 that in turn generates an output to switch driver 50 to enable switching of the switching transistor at a desired duty cycle. The duty cycle may vary in different embodiments. In some implementations, given the different power requirements of a load to which power supply 60 may be coupled, PWM controller 20 may automatically alter the duty cycle to enable longer (or shorter) on-times for the switching transistor based on the power required by SLIC 70.

In operation, PWM controller 20 performs a comparison between several input signals. Specifically, PWM controller 20 is coupled to receive a DC voltage from an error amplifier 40. As shown in FIG. 1, a feedback voltage, $V_{FB}$, from power supply 60 may be coupled to a summing block 35 which further receives a reference voltage, $V_{REF}$. Summing block 35 thus outputs a result of a comparison between the feedback voltage and the reference voltage. This result, i.e., an error signal, is coupled to error amplifier 40 (which may include a hash filter), which in turn generates an amplified error output signal (i.e., a DC output) indicative of the output voltage from power supply 60.

PWM controller 20 is further coupled to receive a reference signal to compare to the DC voltage. Although the scope of the present invention is not limited in this regard, in the embodiment of FIG. 1, the reference signal may be a signal received from an oscillator 30. More specifically, an oscillator 30 may provide an output signal, e.g., a clock output signal (CLKOUT) to PWM controller 20. In various embodiments, this output signal from oscillator 30 may be a triangle-shaped waveform (e.g., a saw tooth signal), although the scope of the present invention is not limited in this regard. For example, in other implementations the clock output may be another such shaped signal.

PWM controller 20 may compare the value of the DC voltage to the clock output signal, and based on this comparison, generate a control signal to power saver circuit 80 that in turn generates an output to switch driver 50 so that it may control the switching transistor of power supply 60. In the embodiment of FIG. 1, when the value of the clock output signal exceeds the value of the error amplifier output (i.e., DC voltage), PWM controller 20 disables its output.

The output of PWM controller 20 is coupled to power save circuit 80. In addition, power save circuit 80 receives a pulse signal (i.e., PULSE OUT) from oscillator 30, which may be generated in synchronization with a rising or falling edge of the clock output signal. Under control of an enable signal, namely a power save enable signal from SLIC 70, power save circuit 80 may reduce a rate at which the control signal from PWM controller 20 is coupled through power save circuit 80 and provided to switch driver 50. Note that the enable signal may be generated from monitoring circuitry within SLIC 70 that monitors conditions on the tip and ring lines. In this way, in low load conditions of SLIC 70, the rate at which the PWM control signal is provided to switch driver 50 is reduced. This reduction leads to a corresponding reduction in the rate of the drive signal generated in switch driver 50, and accordingly the rate at which a switching transistor or other switching element of power supply 60 switches. By reducing the rate of switching, the amount of power loss occurring in power supply 60 can be correspondingly reduced.

Note that power save circuit 80 may act to pass through the PWM control signal at its normal rate during normal operation of SLIC 70. That is, at normal loads, PWM controller 20 maintains control of the duty cycle of the switching transistor. However, in idle mode conditions such as an on hook condition of a telephone coupled to SLIC 70 (in implementations in which a load is a SLIC), the power save enable signal allows power save circuit 80 to reduce the rate at which the PWM control signal is coupled to switch driver 50. In various embodiments, power save circuit 80 may be implemented in hardware, firmware, software or combinations thereof.

In various implementations, all of the components shown in FIG. 1 may be implemented in a single integrated circuit. That is, a single substrate may include both the power supply, its control structures and a load to be powered by the power supply. In many implementations, the circuitry of this IC may be formed on a single substrate using a process that can form various structures including, e.g., bipolar transistors and metal oxide semiconductor field effect transistors (MOSFETs). While described with this particular implementation in the embodiment of FIG. 1, it is to be understood that the scope of the present invention is not so limited.

Figure 2:
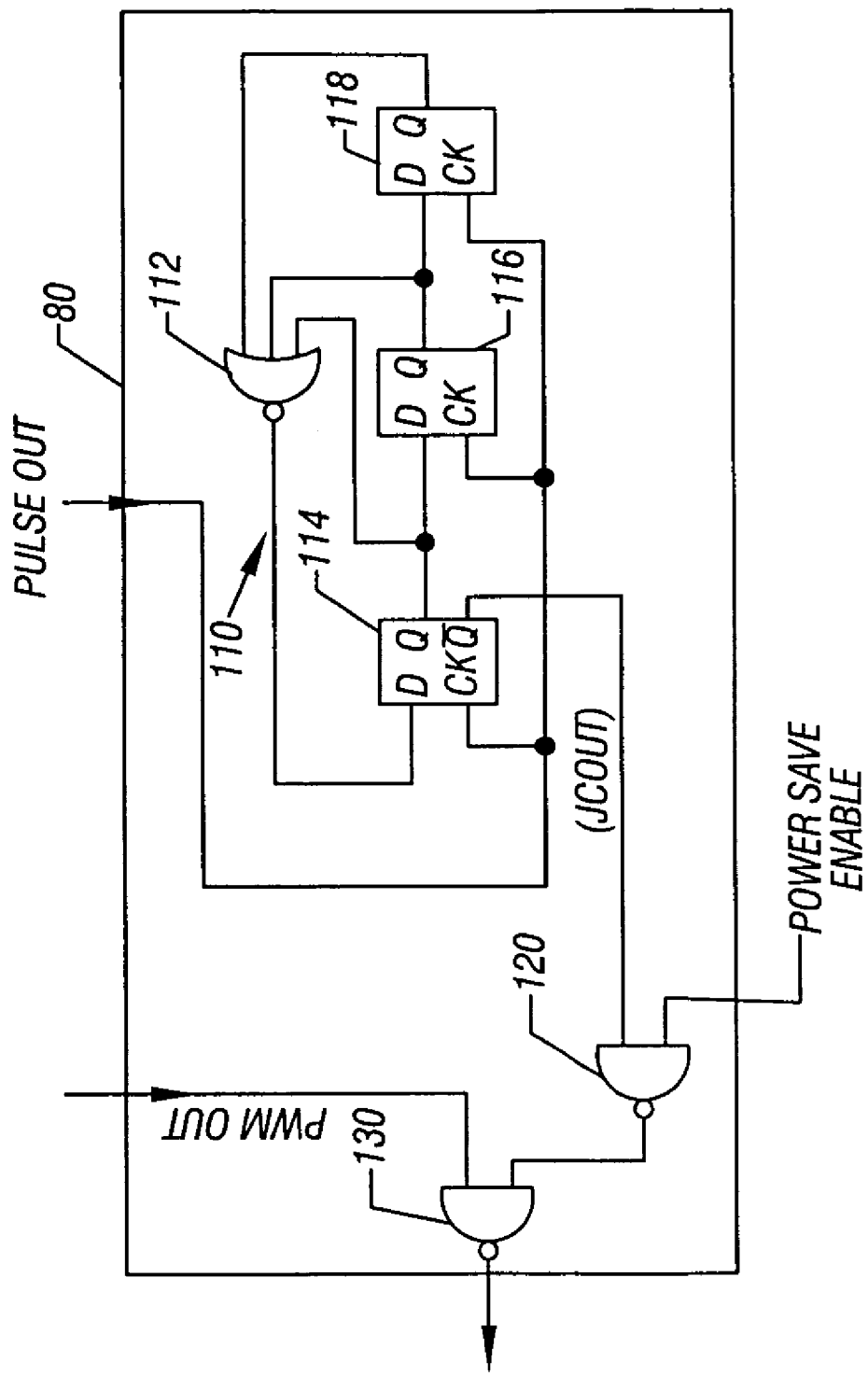
FIG. 2 is a schematic diagram of a power saving circuit in accordance with one embodiment of the present invention.

Referring now to FIG. 2, shown is a schematic diagram of power saving circuitry in accordance with an embodiment of the present invention. As shown in FIG. 2, power save circuit 80 includes logic circuitry coupled to receive input signals and to generate an output therefrom. Specifically, as shown in FIG. 2, circuitry 80 includes a counter circuit 110 which in the embodiment of FIG. 2 is shown as being a Johnson counter, and more particularly a three-stage Johnson counter. While shown with this particular implementation, in other embodiments different counter mechanisms such as other types of counters, shift registers or the like may be present.

As shown, Johnson counter 110 is coupled to receive a clock signal (e.g., PULSE OUT from oscillator 30 of FIG. 1), which is provided to clock inputs of three latch circuits, namely D-type flip-flops 114, 116 and 118. The Q outputs of each of these flip-flops is coupled to a NOR gate 112 that in turn provides an input to first flip-flop 114. In this way, Johnson counter 110 generates an output (JCOUNT), e.g., from the $\overline{Q}$ output of first flip flop 114 that is active according to a predetermined duty cycle, e.g., 25%. Of course, in other implementations Johnson counter 110 may include more or fewer stages, and other mechanisms to enable an active pulse according to a predetermined duty cycle can be realized. As shown in FIG. 2, the $\overline{Q}$ output of first flip-flop 114 is coupled to a first logic gate 120, which may be a NAND gate that is further coupled to receive a power save enable signal. In various embodiments, this power save enable signal may be a signal generated when a load that is coupled to a switching regulator is in an idle mode, such as on hook condition of a telephone coupled to a SLIC. Accordingly, the power save enable signal may correspond to an indication of an on hook or other idle power state. In various embodiments, this signal may be generated automatically, e.g., via a switch when the telephone is on hook, or in another manner. When this power save signal is active high (in the embodiment of FIG. 2), the output of NAND gate 120 is low. This output is coupled to a second logic gate 130, which also may be a NAND gate, although the scope of the present invention is not limited in this regard.

Second logic gate 130 is further coupled to receive the PWM control signal (e.g., PWM OUT from PWM controller 20 of FIG. 1). Based on the input values, second logic gate 130 generates an output that in turn may be coupled to a switch driver that generates the drive signal for the switching element. Note that the logic circuitry of FIG. 2 may generate an active low output from second logic gate 130 when a PWM control pulse is to be passed through to a switch driver, as the switch driver and switching transistor of a switching regulator may be activated via these active low signals (e.g., via a pMOSFET or other such device).

Note that when the power save enable signal is inactive, the output of first logic gate 120 remains at a logic high level, which in turn enables the PWM control signal to control operation of second logic gate 130. When the power save enable signal is active, the PWM control signal controls the output of second logic gate 130 according to the output of counter 110. That is, every $N^{th}$ pulse of the PWM control signal is coupled through second logic gate 130 to drive the switch driver, which in turn switches on the switching element of the switching regulator. Thus in a power save mode, power save circuit 80, via counter 110, controls the duty cycle of the switching transistor. While described with this particular implementation in the embodiment of FIG. 2, it is to be understood that the scope of the present invention is not so limited.

Figure 3:
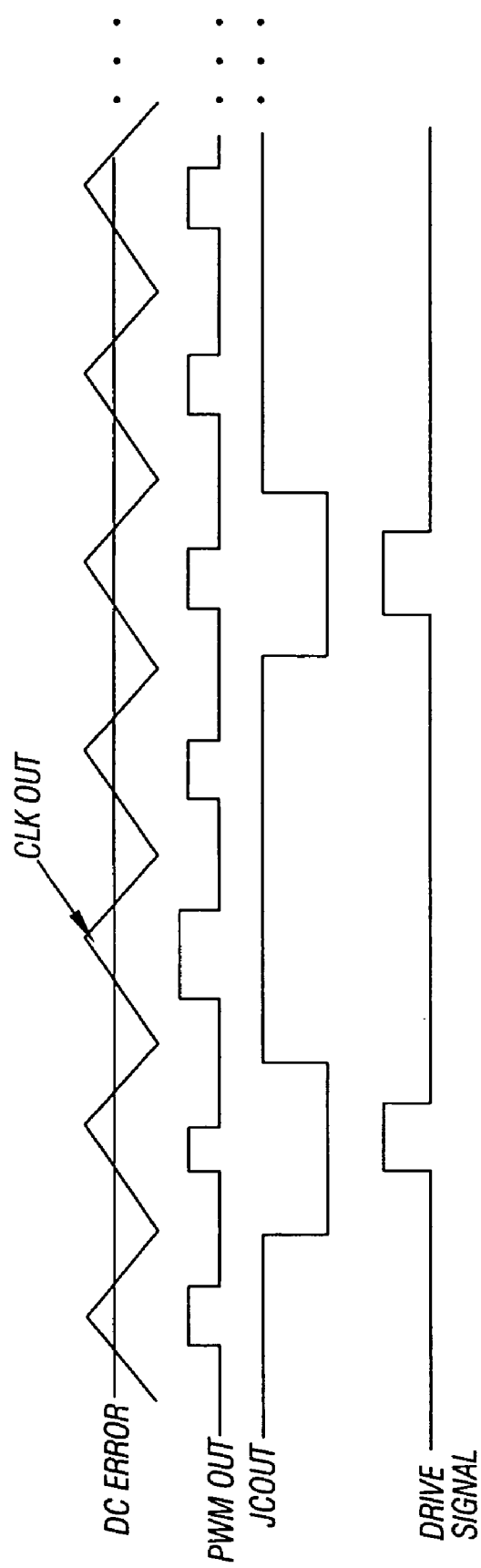
FIG. 3 is a timing diagram of various operations occurring during use of a system in accordance with an embodiment of the present invention.

Referring now to FIG. 3, shown is a timing diagram of operation of a power supply in accordance with an embodiment of the present invention. As shown in FIG. 3, a control signal from a PWM controller is generated when the value of the clock signal is greater than the value of the error amplifier output, namely a DC voltage. Accordingly, the PWM control signal is generated at a rate in accordance with a normal duty cycle for the power supply. However, during times when a load coupled to the power supply is in a low power state, e.g., during an idle state, a power save enable signal (not shown in FIG. 3) is activated to allow the power save circuit to reduce the rate at which the PWM control signal is coupled to the switch driver. Specifically, as shown in FIG. 3 an output of timing circuitry within the power save circuit may be active (i.e., active low) at a reduced rate of the PWM control signal. For example in the embodiment of FIG. 3, the output of the Johnson counter (i.e., JCOUT) is active low every fourth pulse of the PWM control signal.

In turn, additional logic circuitry within the power save circuit may enable the drive signal to the switching transistor to be active at this reduced rate. Accordingly, as shown in FIG. 3, the drive signal is active only when a PWM control pulse is present and the output of the Johnson counter is active. While shown with this particular implementation in the embodiment of FIG. 3, the scope of the present invention is not limited in this regard and in other embodiments, different reduced rates for providing a drive signal can be realized. While the timing diagram shown in FIG. 3 is a representative implementation, it is to be understood that the scope of the present invention is not limited in this regard and other manners of reducing a rate of a power supply to enable reduced power losses when coupled to a variable load may be realized.

Figure 4:
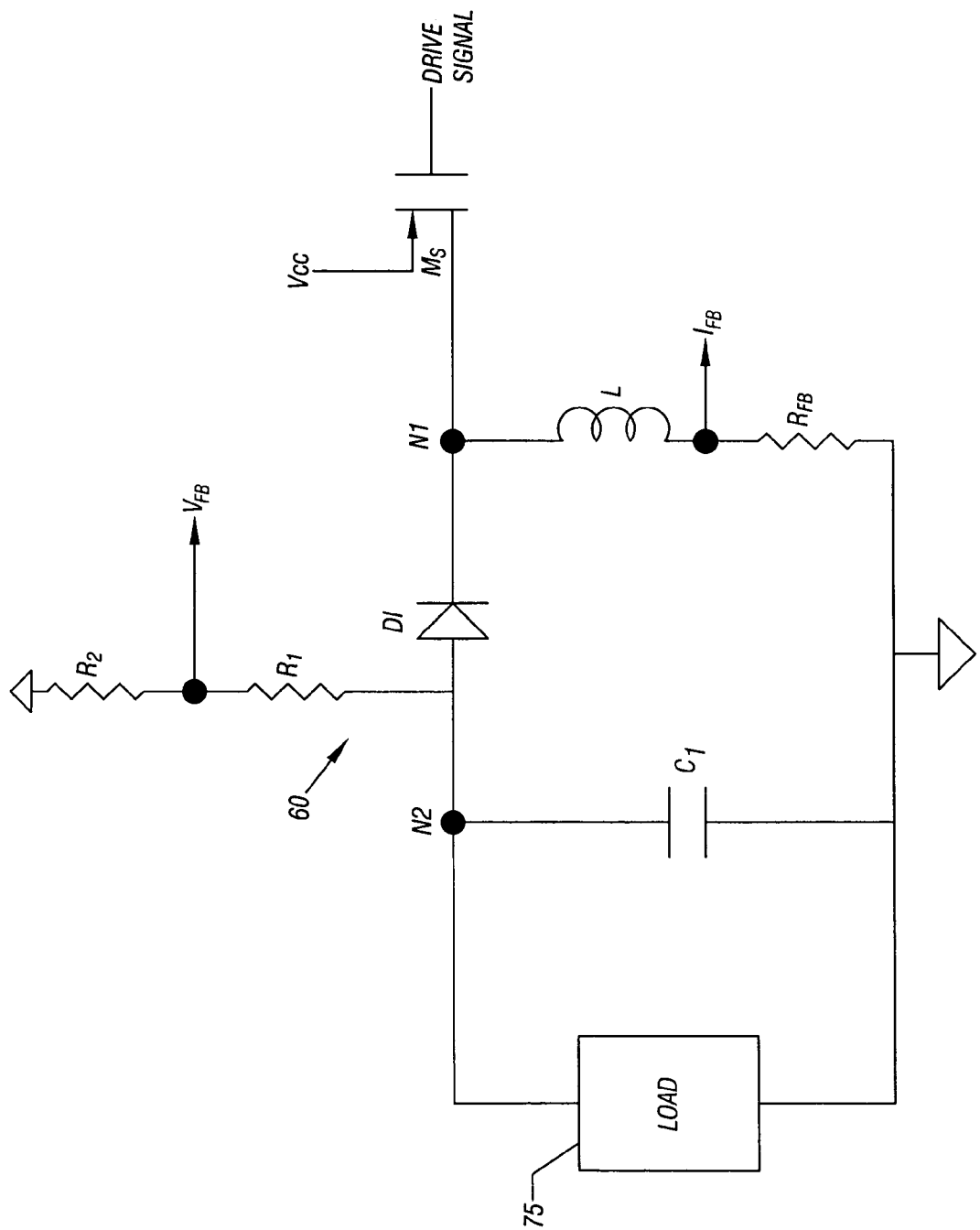
FIG. 4 is a schematic diagram of a power supply in accordance with an embodiment of the present invention.

Referring now to FIG. 4, shown is a schematic diagram of a power supply in accordance with an embodiment of the present invention. As shown in FIG. 4, power supply 60 may be used to provide a negative voltage to a load 75, e.g., a SLIC that receives a negative voltage. However, it is to be understood that the scope of the present invention is not limited in this regard and in other implementations a power saving mechanism may be used with positive-based power supplies.

As shown in FIG. 4, a switching transistor, $M_S$ which may be a pMOSFET in one embodiment is gated by a drive signal. This drive signal may be the output of a switch driver coupled to power supply 60. When on, the switching transistor passes a supply voltage, which may be an unregulated supply voltage $V_{cc}$ coupled to its source terminal through its drain terminal. In turn, the voltage may be used to charge an inductor L coupled to $M_S$ at a node N1. In various implementations, a single inductor L, which in the embodiment of FIG. 4 acts as a flyback inductor, may be present that can handle power requirements across a wide range. In these implementations, the single inductor may be optimized for a normal mode of operation of a load. For example, the normal mode of operation may correspond to a middle voltage level between a lowest voltage level and a highest voltage level of the load. By optimizing coil size for this normal mode of operation, efficient operation may be effected and size of the power supply controlled accordingly. In other embodiments, instead of an inductor, coils of a transformer may be provided as an inductive mechanism. To obtain a feedback current ($I_{FB}$) for use in measuring the inductive current, a feedback resistor, RFB, which may be a small resistor, e.g., a 0.1 ohm resistor may be coupled to inductor L.

In turn, a diode D1 is coupled between node N1 and a second node N2, which in turn has a filter capacitor C1 coupled between it and ground. Note that a resistor divider formed of resistors R1 and R2 may be coupled between diode D1 and node N2 to generate a feedback voltage (i.e., $V_{fb}$). This feedback voltage may be provided for comparison to a reference voltage.

A load 75, which may be a SLIC or other circuit receiving a negative voltage, is coupled between node N2 and ground. In this way, when gated by the drive signal, the unregulated supply voltage is switched into the circuit to generate the inductive current in inductor L. When the drive signal gates off the switching transistor, inductor L discharges into load 75, as filtered by capacitor C1. Of course other implementations of a power supply are possible, including a supply to generate a positive voltage.

Figure 5:
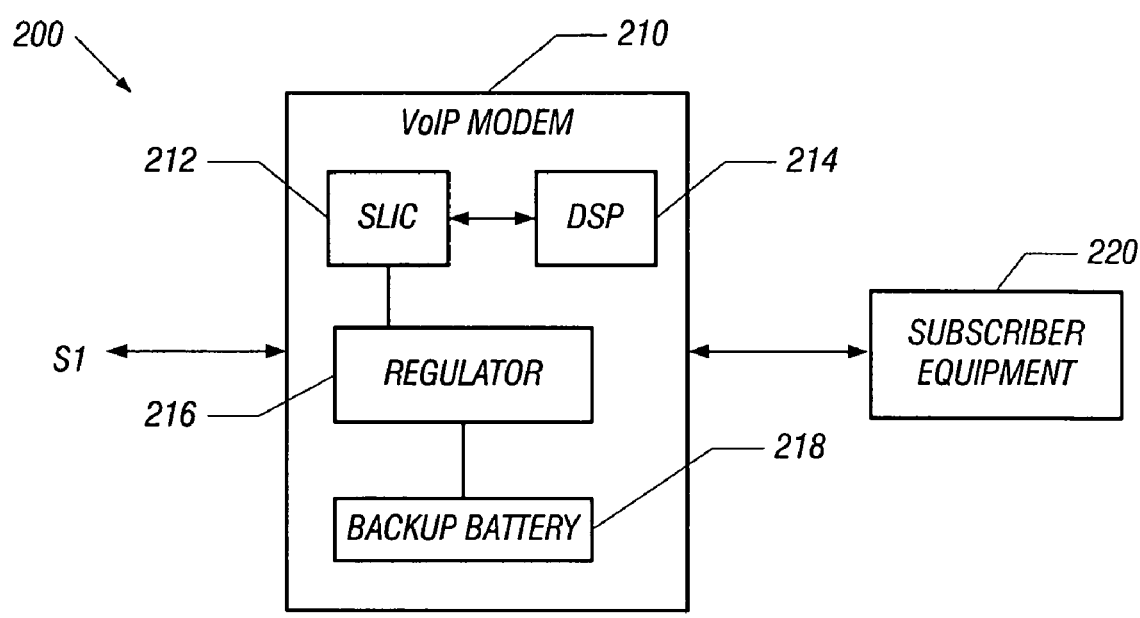
FIG. 5 is a block diagram of a system in accordance with another embodiment of the present invention

A voltage regulator including a power saver mechanism as disclosed herein may be used in many different types of systems. For example, a voltage regulator may be used with a load such as a SLIC or other telephone circuitry. In certain contexts, the voltage regulator may be implemented in a system such as a voice over Internet protocol (VoIP) implementation, such as a VoIP modem coupled between a subscriber loop and subscriber equipment. Specifically, as shown in the embodiment of FIG. 5, such a VoIP modem 210, which may include voltage regulator circuitry 216 in accordance with an embodiment of the present invention, may be coupled between a subscriber loop S1 and subscriber equipment 220, which may correspond to a telephone, computer system, or other communication device, in various embodiments. As shown in FIG. 5, modem 210 further includes a DSP 214 coupled to a SLIC 212. In the embodiment of FIG. 5, SLIC 212 may be powered by regulator 216, while DSP 214 may be powered by another source that provides, e.g., a 5V or 3.3V regulated level. In some embodiments, at least SLIC 212 and regulator 216 may be integrated on a substrate of a single integrated circuit.

Note that modem 210 may further include a backup battery 218 that can provide an unregulated voltage to regulator 216, e.g., when line currents are unavailable. By using embodiments of the present invention, the capacity of backup battery 218 may be better maintained as reduced power losses can be realized in low power modes of subscriber equipment 220.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A voltage regulator:
    a pulse width modulation (PWM) controller to generate a PWM control signal based on a voltage level of a load coupled to the voltage regulator;
    a driver to provide a drive signal to a switching element of the voltage regulator responsive to the PWM control signal; and
    a power saver coupled between the PWM controller and the driver to receive the PWM control signal and to output the PWM control signal to the driver at a reduced rate during an idle mode of the load, wherein the power saver is to receive an enable signal from the load during the idle mode and comprises a logic circuit including:
        a counter to receive a clock signal and generate a counter output; and
        circuitry to receive the counter output, the enable signal, and the PWM control signal and to output the PWM control signal at the reduced rate.

2. The voltage regulator of claim 1, wherein the power saver is to output the PWM control signal at a full rate during a normal mode of the load.

3. The voltage regulator of claim 1, wherein the counter comprises a Johnson counter.

4. The voltage regulator of claim 1, wherein the counter is to control output of the PWM control signal to the driver during the idle mode and the PWM controller is to control output of the PWM control signal to the driver during the normal mode.

5. The voltage regulator of claim 1, wherein the logic circuit is to output the PWM control signal at the reduced rate corresponding to one pulse per N pulses of the PWM control signal.

6. A system comprising:
    a voltage regulator including:
        a switching element controlled by a drive signal, wherein the drive signal is controlled by a duty cycle controller; and
        power saving means coupled to the duty cycle controller to reduce a rate at which the duty cycle controller controls the drive signal, comprising a counter to receive a clock signal and generate a counter output based thereon and logic circuitry to receive the counter output, the enable signal, and a duty cycle signal and to output the duty cycle signal at the reduced rate; and
    a circuit coupled to the voltage regulator to be powered by the voltage regulator, wherein the circuit is operable at least at a first load level and a second load level higher than the first load level, wherein the circuit is to send an enable signal to the power saving means when operating at the first load level and to not send the enable signal when operating at the second load level.

7. The system of claim 6, wherein the first load level comprises an idle mode.

8. The system of claim 6, wherein the power saving means is to receive a duty cycle signal from the duty cycle controller and to pass one of every N pulses of the duty cycle signal to a driver coupled to provide the drive signal to the switching element.

* * * * *